(12) United States Patent
Lyons

(10) Patent No.: US 6,643,908 B1
(45) Date of Patent: Nov. 11, 2003

(54) BODY SIDE PANEL FOR A MOTOR VEHICLE

(76) Inventor: Michael Patrick Lyons, 15 Fetherwood Ct., Simpsonville, SC (US) 29680

( * ) Notice: Subject to any disclaimer, the term of this patent is extended or adjusted under 35 U.S.C. 154(b) by 0 days.

(21) Appl. No.: 10/136,430

(22) Filed: May 2, 2002

(51) Int. Cl.[7] .................................................. B23P 9/00
(52) U.S. Cl. ...................... 29/445; 29/423; 29/897.2; 296/191
(58) Field of Search .......................... 29/423, 462, 445, 29/897.2, DIG. 48; 296/191, 198; 72/379.2

(56) References Cited

U.S. PATENT DOCUMENTS

| | | | |
|---|---|---|---|
| 2,254,458 A | | 9/1941 | Swallow |
| 2,284,697 A | | 6/1942 | Trautvetter |
| 2,669,015 A | * | 2/1954 | Schanz .................... 228/182 |
| 2,747,265 A | | 5/1956 | Boessenkool |
| 4,252,364 A | * | 2/1981 | Toyama et al. ............. 296/185 |
| 4,509,293 A | * | 4/1985 | Ufrecht et al. ................ 49/502 |
| 4,717,197 A | * | 1/1988 | Harasaki ..................... 296/187 |
| 4,973,103 A | * | 11/1990 | Imajyo et al. .............. 296/195 |
| 5,276,304 A | | 1/1994 | Sauvage et al. |
| 5,297,836 A | * | 3/1994 | Parry-Williams ........... 296/203 |
| 5,747,768 A | | 5/1998 | Peru et al. |
| 6,029,334 A | | 2/2000 | Hartley |
| 6,034,347 A | | 3/2000 | Alber et al. |
| 6,120,089 A | | 9/2000 | Kalstiantz et al. |
| 6,308,411 B1 | * | 10/2001 | Wright et al. .............. 29/897.2 |

FOREIGN PATENT DOCUMENTS

GB 2081331 A * 2/1982 ............. E04B/2/60

* cited by examiner

Primary Examiner—Gregory Vidovich
Assistant Examiner—Essama Omgba
(74) Attorney, Agent, or Firm—Pillsbury Winthrop LLP

(57) ABSTRACT

An efficient method of forming a vehicle body side panel from a blank constructed to reduce wasted material and manufacturing time. The method includes connecting first and second opposing sheet members and first and second middle sheet members to form the blank. The sheet members being spaced from each other such that an opening extends through the blank. The opening having an original perimeter that is formed by the first and second opposing sheet members and the first and second middle sheet members. The method also includes removing a portion of one of the sheet members adjacent the opening to remove a section of the original perimeter of the opening and to enlarge the opening beyond its original perimeter.

1 Claim, 6 Drawing Sheets

BODY SIDE PANEL FOR A MOTOR VEHICLE

FIELD OF THE INVENTION

The present invention relates to motor vehicle body construction. More specifically, the illustrative embodiments of the present invention relate to methods and apparatuses for making body panels for motor vehicles.

BACKGROUND

Body side panels for motor vehicles have been formed by shaping a blank by stamping. The blanks have been made by welding four separate metal sheets together along their lines of attachment to form a single sheet having no openings extending therethrough. Interior portions of the blank are then cut out and removed to form spaced openings to provide, for example, door openings. The material removed from the blank to form the two openings can include areas where the sheets are welded together. The removed material is subsequently discarded as waste.

SUMMARY

The present invention can be embodied in a method of forming a body side panel, including providing first and second opposing sheet members; providing first and second middle sheet members; connecting each of the middle sheet members to each of the first and second opposing sheet members to form a blank, such that the first and second opposing sheet members are spaced from each other and such that the first and second middle sheet members are spaced from each other, the blank having an original opening extending through the blank, the original opening having an original perimeter being formed by the first and second opposing sheet members and the first and second middle sheet members; and removing a portion of one of the first opposing sheet member, the second opposing sheet member, the first middle sheet member, and the second middle sheet member, the portion being removed being adjacent the original opening such that a section of the original perimeter of the original opening is removed to enlarge the original opening beyond its original perimeter and to form an enlarged opening.

Other aspects, features, and advantages of the present invention will become apparent from the following detailed description of the illustrative embodiments, the accompanying drawings, and the appended claims.

DETAILED DESCRIPTION OF ILLUSTRATIVE EMBODIMENTS

Figure 1:
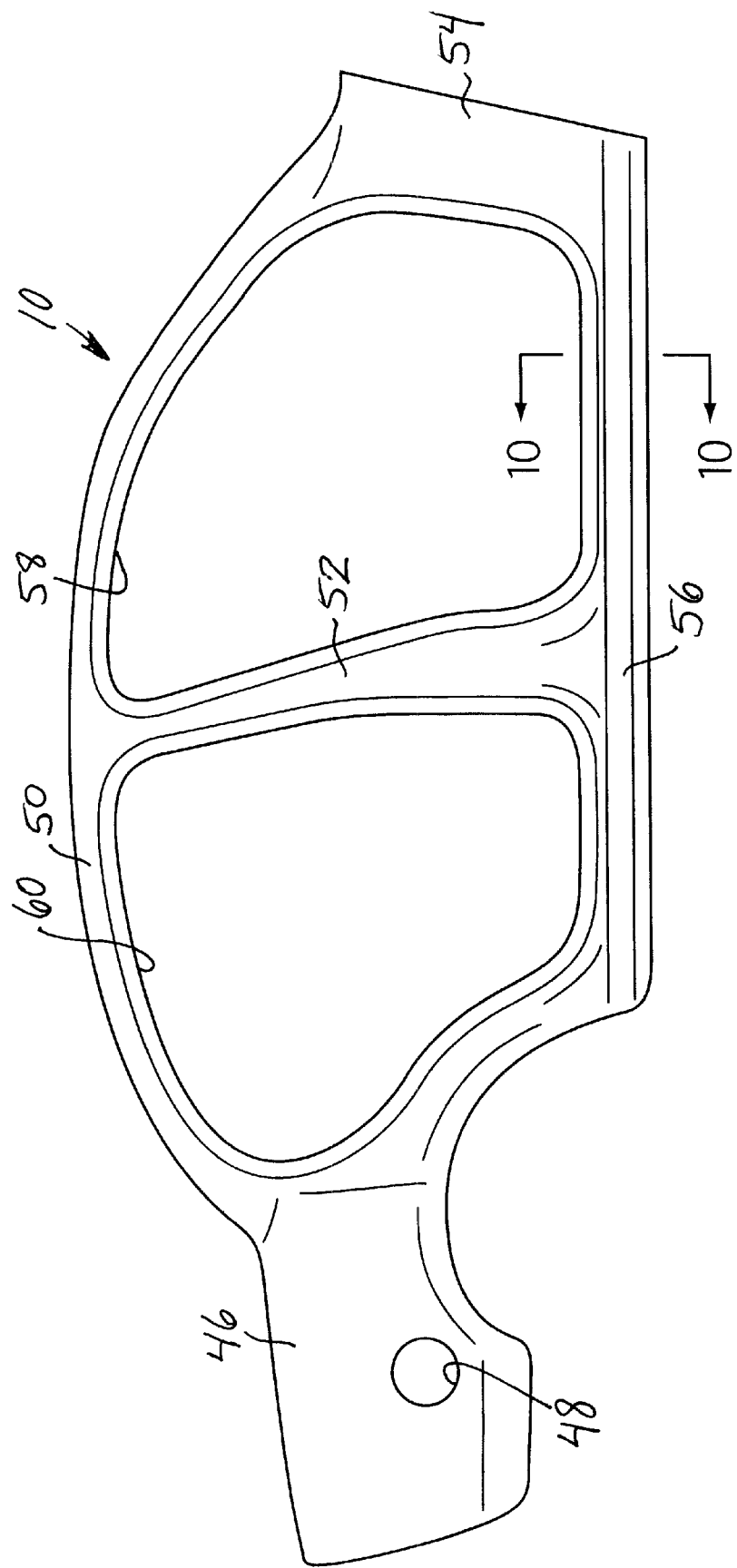
FIG. 1 illustrates an embodiment of a body side panel formed by shaping a blank constructed according to the invention.
Figure 2:
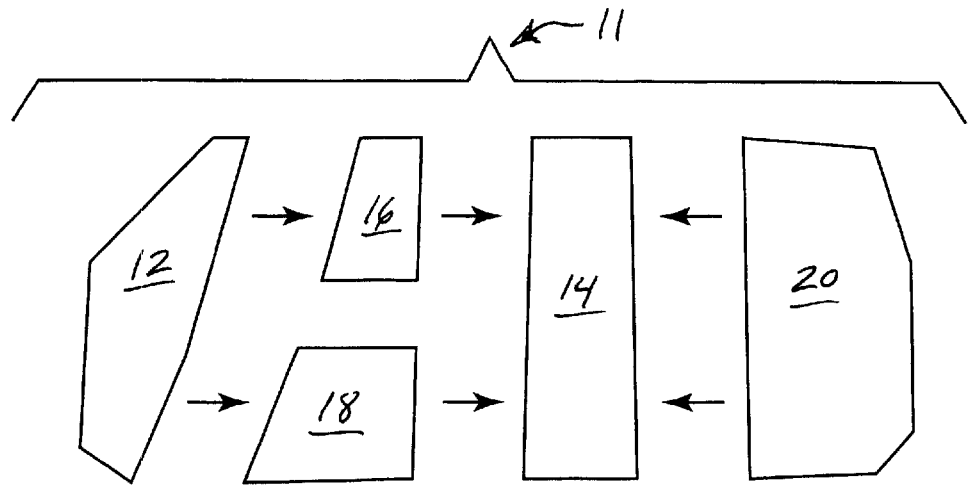
FIGS. 2–4 illustrate a method of constructing a blank in accordance with one illustrative embodiment of the present invention.
Figure 3:
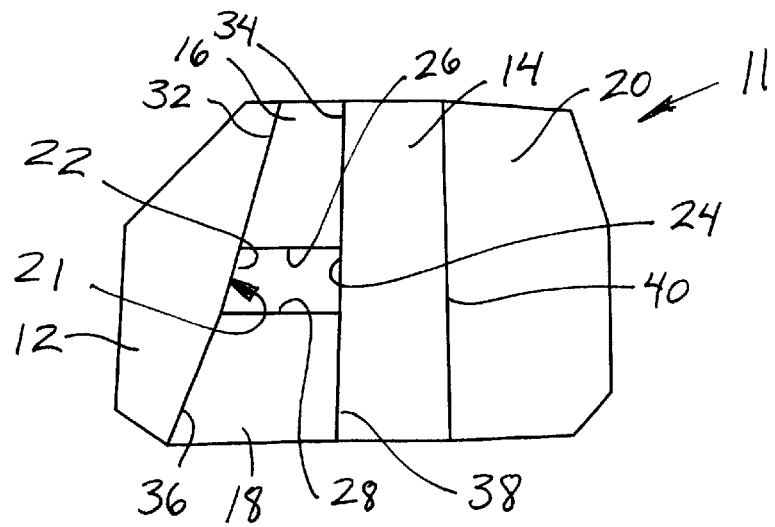
Figure 4:
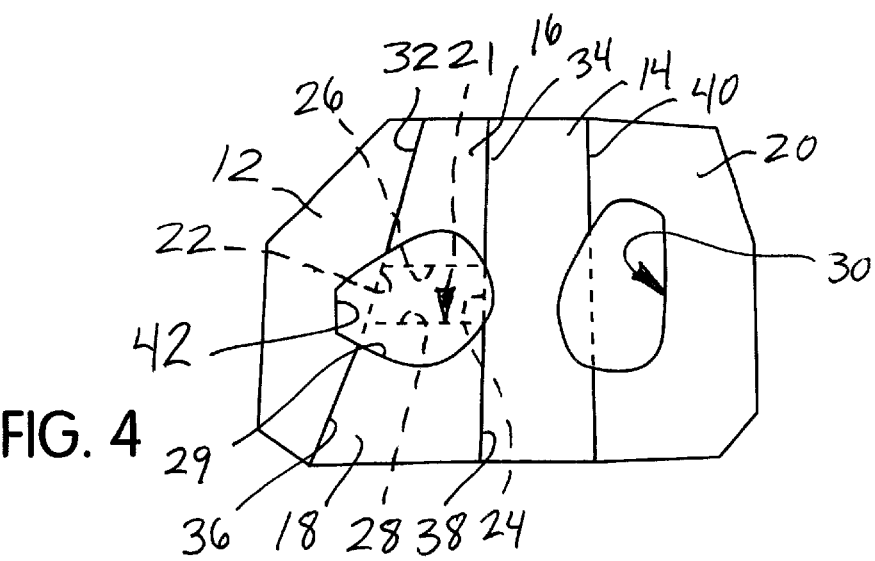

FIG. 1 shows an illustrative embodiment of a body side panel 10 constructed according to the principles of the present invention. The body side panel 10 is preferably constructed of sheet metal and is formed by shaping a blank by stamping or other appropriate methods. FIGS. 2–4 show the construction of an illustrative embodiment of a blank 11 that can be shaped by stamping, for example, to form the body side panel 10 for a motor vehicle. The blank 11 is formed by connecting first and second opposing sheet members 12, 14, first and second middle sheet members 16, 18 and end sheet member 20. Each of the middle sheet members 16, 18 is connected to each of the opposing sheet members 12, 14 so that the opposing sheet members 12, 14 are spaced from each other and so that the middle sheet members 14, 16 are spaced from each other.

This spacing of the sheet members 12, 14, 16, 18 forms an original opening 21 that extends through the blank 11. The original perimeter of the original opening 21 is formed by the respective edges 22, 24, 26, 28 of the sheet members 12, 16, 18, 20. The original perimeter of the original opening 21 may be enlarged and/or shaped by removing a portion of one or more of the sheet members 12, 16, 18, 20 adjacent the original opening 21 to form an enlarged opening 29. That is, the enlarged opening 29 is formed by removing a section of the original perimeter of the original opening 21 to enlarge the original opening 21 beyond its original perimeter. One or more additional openings, such as opening 30 in FIG. 4, may also be formed in the blank 11 by cutting out sections of one or more of the sheet members 12, 16, 18, 20. As discussed below, in the preferred embodiments, each opening in the blank 11 corresponds to a door opening in the body side panel 10.

The apparatuses and methods of the present invention reduce the amount of waste generated when making a body side panel 10 because the sheet members 12, 16, 18, 20 of the blank 11 are connected to form the original opening 21. Therefore, no material needs to be cut out and removed from the blank 11 to form the original opening 21. If the original perimeter of the original opening 21 is enlarged or shaped by removing a portion of one or more of the sheet members 12, 16, 18, 20 adjacent the original opening 21, this enlarging/shaping of the original perimeter generates relatively little waste. For example, as can be understood from FIGS. 3 and 4, the amount of material that is discarded when the original opening 21 is enlarged to form the enlarged opening 29 is much less than would be the case if the enlarged opening 29 had been formed by cutting and removing material from a solid blank, that is, a blank without any opening or openings. Of course, the closer the size of the original opening 21 is to that of the enlarged opening 29, the smaller the size of the removed portion of the blank 11 and the smaller the amount of discarded and wasted material.

FIG. 2 shows the individual sheet members 12, 16, 18, 20 in exploded relation to one another. Each sheet member 12, 16, 18, 20 is preferably constructed of a metal material such as a steel or any other appropriate material of suitable strength. The illustrated sheet members 12, 16, 18, 20 are generally planar (although this is not required) and are connected together to form the blank 11 by welding or any other appropriate method. Laser welding, for example, may be used to connect the sheet members 12, 16, 18, 20 together along their edges. When the sheet members 12, 16, 18, 20 are welded together, the blank 11 includes a plurality of weld lines or seams. The middle sheet member 16 is welded to the opposing sheet members 12, 14 along respective seams 32, 34 and the middle sheet member 18 is welded to the opposing sheet members 12, 14 along respective seams 36, 38 (see FIG. 3, for example). The sheet members 14, 20 are welded together along seam 40.

No welding need occur along the perimeter or edges 22, 24, 26, 28 of the original opening 21 to connect the sheet members together. It can be appreciated that in the illustrated configuration, only one seam, seam 40, extends continuously from one outside edge of the blank 11 to another outside edge. Each weld seam 32, 34, 36, 38 extends continuously from at or near an outside edge of the blank 11 to at or near an edge of the original opening 21, as needed for a sufficiently secure connection. Because the blank 11 includes only one seam that extends continuously between outside edges, the blank 11 requires less welding than would be the case if the blank were formed to have no openings.

After the sheet members 12, 16, 18, 20 are connected to form the blank 11, if the original opening 21 needs to be enlarged or reshaped, the original opening 21 can be enlarged or reshaped by cutting out portions of one or more of the sheet members 12, 14, 16, 18 as mentioned above. In addition, the second opening 30 may be provided in the blank by any appropriate method. The enlargement of the original opening 21 and the formation of the opening 30 can occur prior to the stamping of the blank 11 to form the side body panel 10 or can occur during, i.e., as part of, a stamping operation. Also, although FIGS. 2–4 show that the second opening 30 is formed by cutting out portions of the sheet members 14, 20 in which there is no opening prior to the cutting, the construction of the blank 11 could be modified to include two additional sheet members connected between the sheet members 14 and 20 so that a second opening is formed that is similar to the original opening 21.

As shown in FIG. 4, the original perimeter of the original opening 21 formed by edges 22, 24, 26, 28 is enlarged to form a new perimeter 42, which defines the enlarged opening 29. The edges 22, 24, 26, 28 forming the original perimeter of the original opening 21 are shown in dashed lines in FIG. 4. It can be appreciated that portions of the sheet members 12, 14, 16, 18 adjacent the original opening 21 were cut out and removed to form the enlarged opening 29 as discussed above. Portions of the welded seams 32, 34, 36, 38 that extend inside the perimeter of the enlarged opening 29 are also removed during formation of the enlarged opening 29. Although portions of four sheets 12, 14, 16, 18 are removed in the illustrative embodiment shown in FIG. 4, this is an example only and not intended to limit the scope of the invention. Thus, the number of sheets from which portions are removed and the size, shape and location of these portions depend on the size, shape and location of the enlarged opening 29 desired. The second opening 30 was formed by cutting out and removing portions of the sheet members 14 and 20 and a portion of the welded seam 40.

Figure 9:
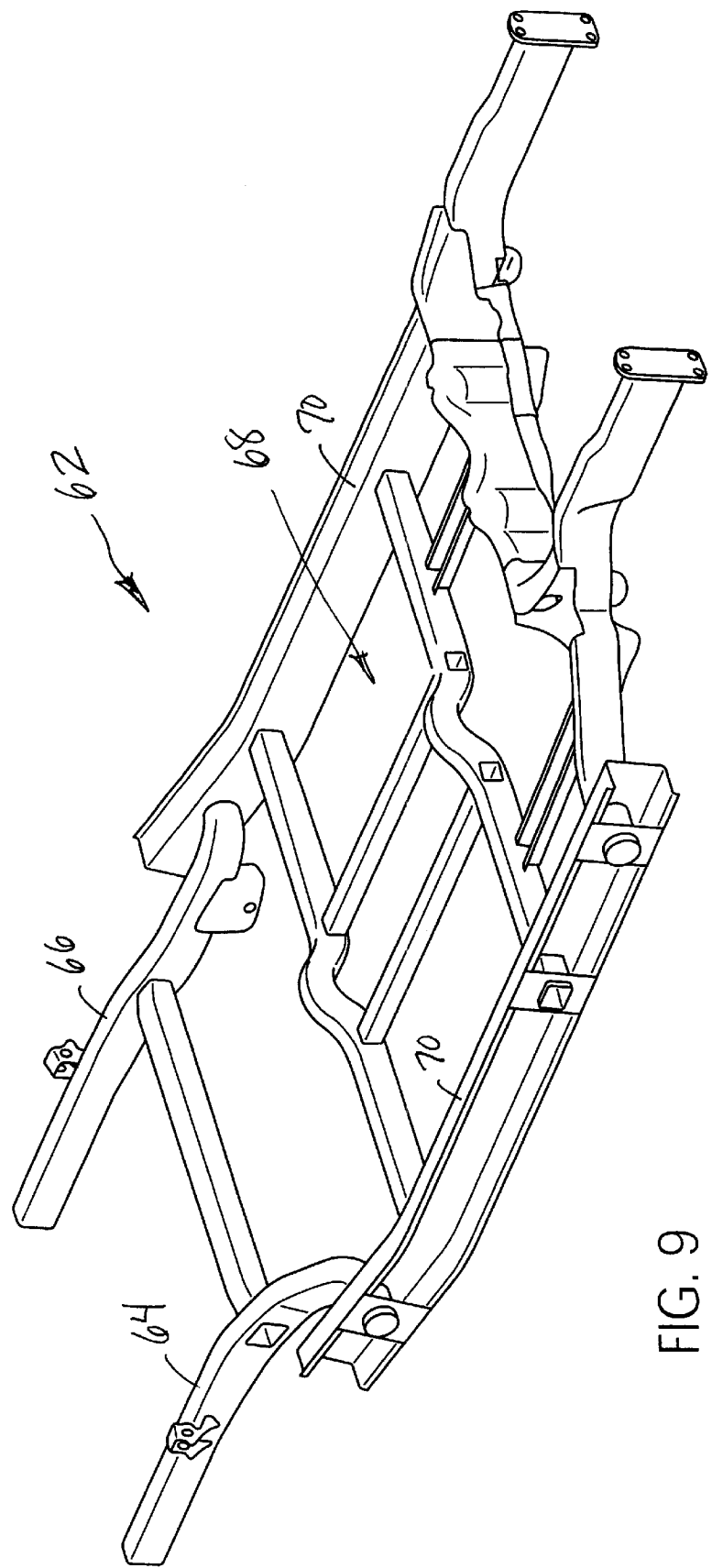
FIG. 9 illustrates a vehicle frame to which the body side panel of FIG. 1 can be mounted.

The blank 11 can be shaped in any appropriate manner, such as by stamping, to form the body side panel 10. As seen in FIG. 1, the body side panel 10 includes a rear fender portion 46, a fuel tank access opening 48, a roof rail portion 50, a B-pillar structure or portion 52, an A-pillar structure or portion 54, a rocker panel- or lower rail-forming structure 56, and a pair of door openings 58, 60. The openings 29, 30 are shaped during stamping to form, respectively, the front and rear door openings 58, 60. The body side panel 10 is mounted on a motor vehicle frame. An example of a motor vehicle frame 62 on which the body side panel 10 could be mounted is shown in FIG. 9. The construction of the frame 62 and the manner in which a body side panel 10 is mounted on the frame 62 are shown and described in commonly assigned U.S. Provisional Patent Application Serial No. 60/331,186 filed on Nov. 09, 2001, which is hereby incorporated by reference in its entirety into the present application.

Figure 10:
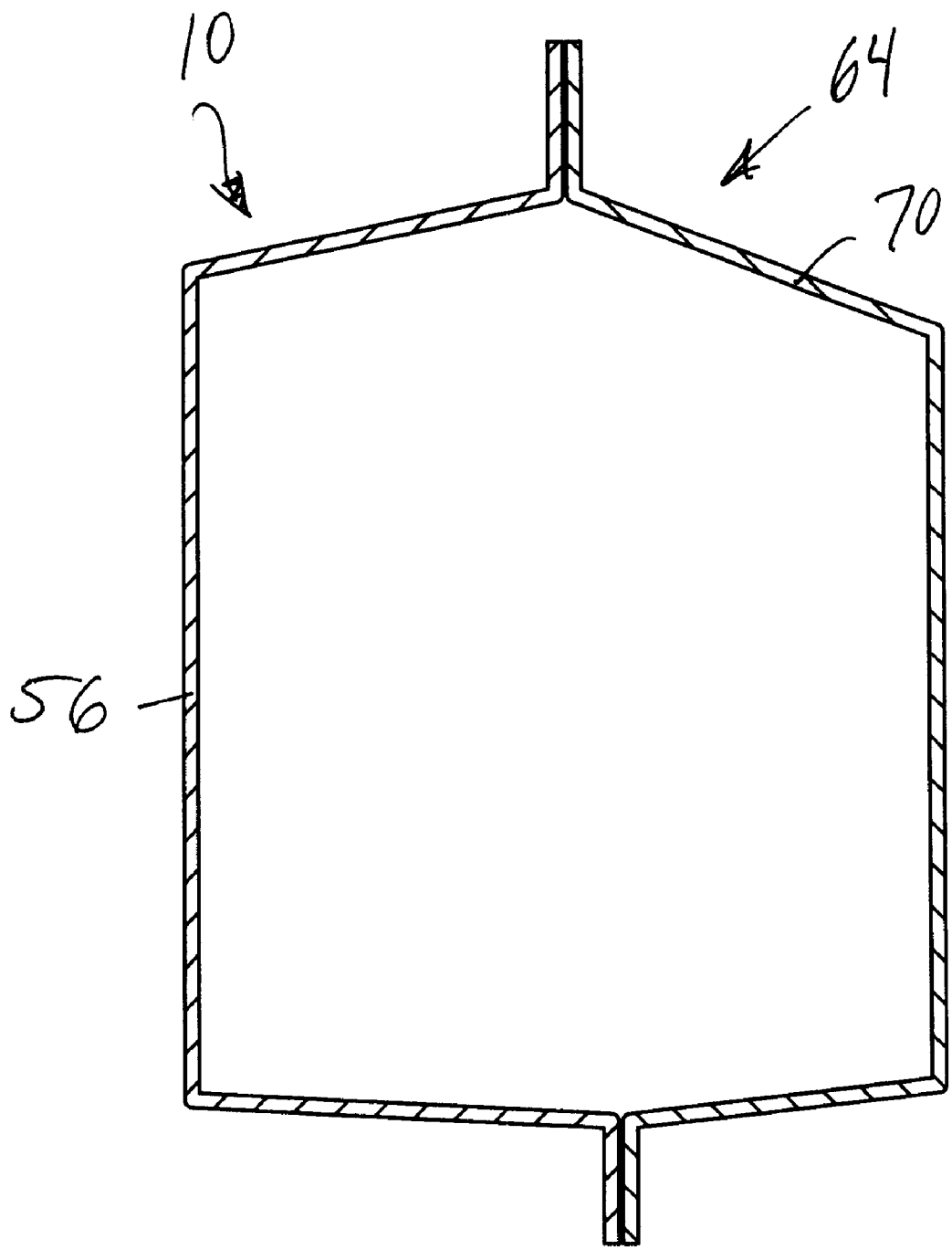
FIG. 10 is a cross section taken through line 10—10 of FIG. 1.

The frame 62 includes a pair of side rails 64, 66 that are held in laterally spaced relation by laterally extending connecting structure 68. Pillars (not shown, but which may include A-, B-, C- and/or D-pillars, for example, as appropriate) may be connected to the side rails 64, 66 before or after each body side panel 10 is mounted on the frame 62. An intermediate portion of each side rail 64, 66 may include a central rail structure that provides a stamped rocker panel structure 70. The rocker panel forming structure 56 of the body side panel 10 and the rocker panel structure 70 may each have generally C-shaped cross-sections so that when the body side panel 10 is mounted on the frame 62, the structures 56, 70 are secured to one another to form a rocker panel having a closed transverse cross section as described in Application No. 60/331,186 and as shown in FIG. 10. It can be appreciated that the various frame and body components of a particular vehicle can be assembled to one another during vehicle construction in a variety of orders, depending on the preferences of the vehicle manufacturer. Accordingly, it is understood that, as mentioned, other structures that are not shown in FIG. 9 (such as vehicle pillars, roof rails, and so on) may be mounted on the frame 62 either before or after the body side panel 10 is mounted on the frame 62.

Figure 5:
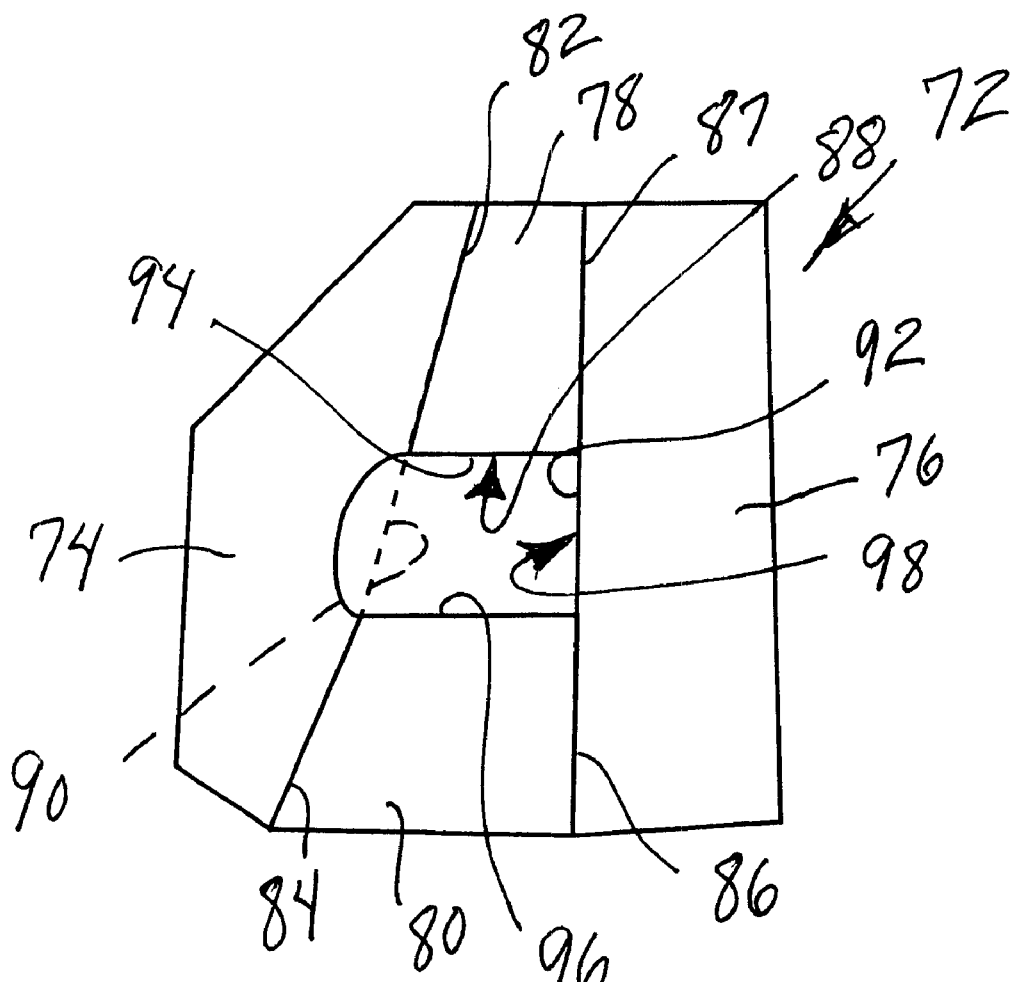
FIG. 5 illustrates a blank in accordance with a second illustrative embodiment of the present invention.

Many other embodiments of blanks are contemplated and within the scope of the present invention. Other examples are shown in FIG. 5 and in FIGS. 6–8. FIG. 5 shows a blank 72 that includes opposing sheet members 74, 76 and middle sheet members 78, 80 that are connected at seams 82, 84, 86, 87, which represent welded connections. The sheet members 74, 76 are spaced from one another and the sheet members 78, 80 are spaced from one another to form an original opening 88 defined by edge 90 (indicated by a dashed line), and by edges 92, 94 and 96. After the sheet members 74, 76, 78, 80 are connected to form the blank 72, the original opening 88 is enlarged to form an enlarged opening 98 by removing a portion of only one sheet member, sheet member 74, adjacent the original opening 88. The blank 72 can then be shaped to form, for example, a body side panel (not shown) having one door opening.

Figure 6:
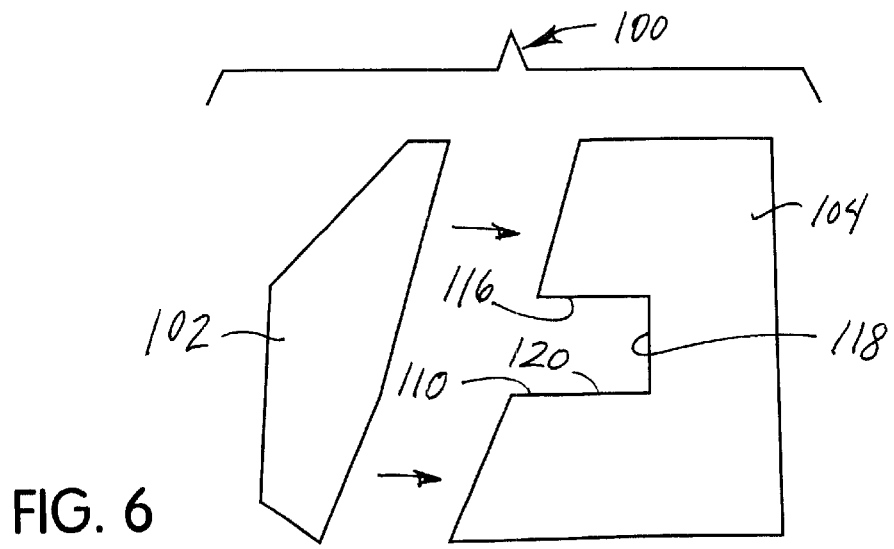
FIGS. 6–8 illustrate a method of forming a blank in accordance with a third illustrative embodiment of the present invention.
Figure 7:
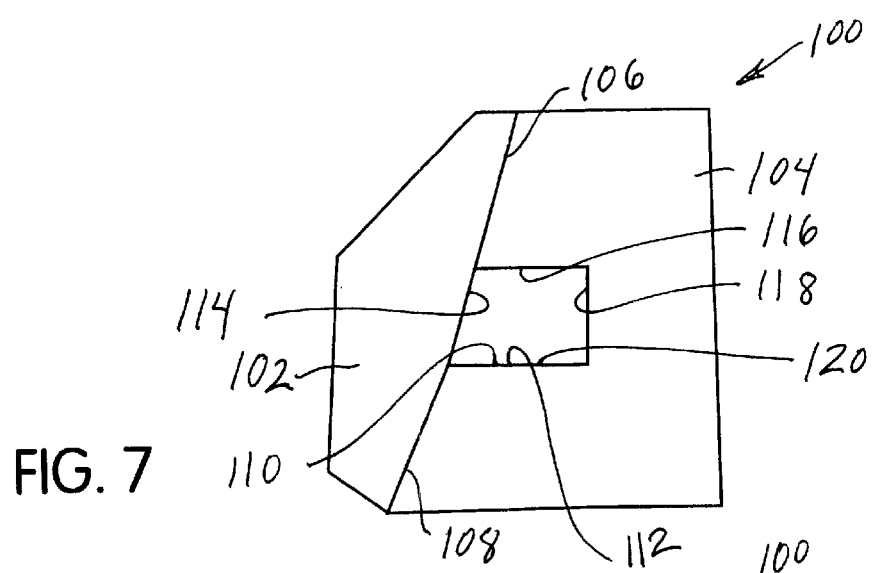
Figure 8:
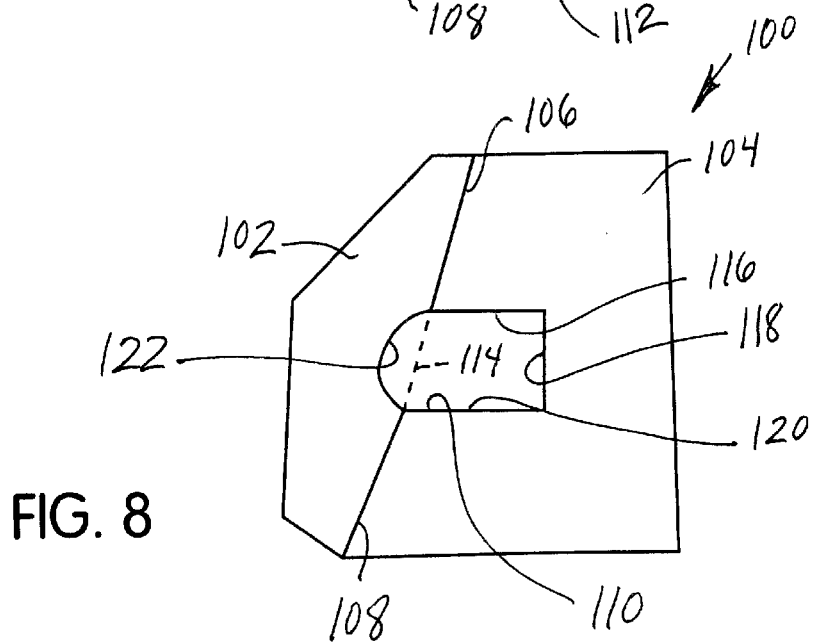

FIGS. 6–8 show the construction of a blank 100 that includes opposing sheet members 102, 104 that are connected at seams 106, 108, which represent welded connections. The sheet member 104 includes a notch 110. When the sheet members 102, 104 are connected to one another, an open side of the notch 110 is closed to form an original opening 112 defined by edge 114 of the sheet member 102 and edges 116, 118, 120 of the sheet member 104. After the sheet members 102, 104 are connected to form the blank 100, the original opening 112 is enlarged to form an enlarged opening 122 by removing a portion of the sheet member 102 adjacent the original opening 112. The blank 100 is preferably shaped to form a body side panel (not shown) for a motor vehicle having one door opening. Although FIG. 8 shows that only a portion of sheet member 102 was removed, one or more portions of the sheet 104 can be removed either alone or in combination with the portion or portions removed from the sheet member 102. Of course, as with the other embodiments, the size, shape and location of any portion or portions removed from one or both of the sheet members 102, 104 depends on the size, shape and location of the original opening 112 and the size, shape and location of the desired enlarged opening 122.

A blank constructed according to the present invention can be shaped to form a panel to be mounted on a vehicle frame and, thus, the panel can comprise an exterior portion of the vehicle, i.e., a portion of the vehicle body, such as the body side panel 10. Other vehicle body components, however, such as vehicle roofs, hatchback-type door panels and so on, can also be constructed by shaping a blank constructed according to the present invention, so that blanks constructed according to the principles of the present invention are not limited in use to constructing body side panels for motor vehicles.

It can also be appreciated that the use of the methods and apparatuses of the present invention are not limited to forming body side panels or other vehicle body parts. For instance, a blank constructed according to the present invention can be shaped to form a portion of a frame of a motor vehicle. For example, a blank can be shaped into a frame component that includes pillar portions, such as A-, B-, C- and/or D-pillars, and rail portions, such as lower side rail and/or roof rail portions. Each pillar portion and each rail portion of the frame component can be constructed to have a C-shaped cross section, for example, and the frame component can be assembled to the motor vehicle such that each pillar portion and each rail portion cooperates with other vehicle frame structures to form a closed cross section when mounted on the vehicle frame.

Alternatively, a blank constructed according to the principles of the present invention can be shaped into a vehicle component that includes portions that are mounted in covering relation to various frame components, such as the A-, B-, C- and/or D-pillars, the lower side rail, and/or roof rail portions. In such an embodiment, the vehicle component made from a blank constructed according to the present invention may be mounted on the frame and/or to the vehicle exterior body panels. For example, a component may be formed from a blank made according to the present invention that partially covers several of the frame components to strengthen the frame and to form frame structures.

Some or all of the frame components mentioned herein, e.g., pillars, rails, etc., may be of tubular hydroformed construction. It is also contemplated to construct a blank by connecting a plurality of sheets together so that the blank includes more than one opening, including more than one interior opening.

While the invention has been disclosed and described with reference with a limited number of embodiments, it will be apparent that variations and modifications may be made thereto without departure from the spirit and scope of the invention and various other modifications may occur to those skilled in the art. Therefore, the following claims are intended to cover modifications, variations, and equivalents thereof.

What is claimed is:

1. A method of forming a body side panel, comprising:

providing first and second opposing sheet members;

providing first and second middle sheet members;

connecting each of the middle sheet members to each of the first and second opposing sheet members to form a blank, such that the first and second opposing sheet members are spaced from each other and such that the first and second middle sheet members are spaced from each other, the blank having an original opening extending through the blank, the original opening having an original perimeter being formed by the first and second opposing sheet members and the first and second middle sheet members; and removing a portion of one of the first opposing sheet member, the second opposing sheet member, the first middle sheet member, and the second middle sheet member, the portion being removed being adjacent to the original opening such that a section of the original perimeter of the original opening is removed to enlarge the original opening beyond its original perimeter and to form an enlarged opening.

* * * * *